United States Patent [19]

Abe

[11] 4,343,645
[45] Aug. 10, 1982

[54] QUENCHING APPARATUS FOR TEMPERING CURVED GLASS PLATES

[75] Inventor: Kenzo Abe, Tokyo, Japan

[73] Assignee: Asahi Glass Company, Ltd., Tokyo, Japan

[21] Appl. No.: 893,399

[22] Filed: Apr. 4, 1978

Related U.S. Application Data

[63] Continuation of Ser. No. 766,369, Feb. 7, 1977, abandoned, which is a continuation of Ser. No. 640,892, Dec. 15, 1975, abandoned.

[51] Int. Cl.³ ............................................. C03B 27/04
[52] U.S. Cl. ...................................... 65/348; 65/114; 65/351
[58] Field of Search ................. 65/104, 114, 115, 348, 65/351

[56] References Cited

U.S. PATENT DOCUMENTS

| 3,008,272 | 11/1961 | Black et al. | 65/104 X |
| 3,186,815 | 6/1965 | Jochim | 65/115 |
| 3,264,078 | 8/1966 | Stilley et al. | 65/114 X |
| 3,799,752 | 3/1974 | Cheron | 65/351 |

Primary Examiner—Arthur D. Kellogg
Attorney, Agent, or Firm—Oblon, Fisher, Spivak, McClelland & Maier

[57] ABSTRACT

Quenching apparatus for tempering curved glass plates includes upper and lower blower head devices which project quenching air, each of the devices including a central blower head and side blower heads disposed upon opposite sides of the central head. The side blower heads are adjustable depending upon the particular curvature of the curved glass plate to be tempered. The nozzles of the central head may also be replaced or exchanged so as to provide partial or full-surface tempering to the plates.

8 Claims, 5 Drawing Figures

QUENCHING APPARATUS FOR TEMPERING CURVED GLASS PLATES

This is a continuation of application Ser. No. 766,369 filed Feb. 7, 1977, now abandoned, which is a Continuation application of Ser. No. 640,892, filed Dec. 15, 1975, now abandoned.

BACKGROUND OF THE INVENTION

1. Field of the Invention

The present invention relates generally to quenching apparatus, and more particularly to quenching apparatus for tempering a curved glass plate by means of blown air.

2. Description of the Prior Art

In the manufacture of a tempered curved glass plate, a glass plate is initially heated to the softening point temperature thereof in order to facilitate bending the same under dead weight conditions. It is also usual to press a glass plate in order to form a curved glass plate and to quench the glass plate by ejecting quenching air upon its surfaces which are maintained at temperatures higher than the bending temperature so as to quench and temper the same.

Within such manufacturing processes, it is usual to use a quenching apparatus for ejecting quenching air wherein blower head devices having a large number of nozzles thereon are arranged with a predetermined gap or space defined above and below the curved glass plate so as to uniformly quench the same depending upon the curvature of the curved glass plate. Moreover, it is usual to employ quenching apparatus for manufacturing a partially tempered glass plate having blower head devices wherein nozzles are also arranged in a predetermined pattern so as to impart different cooling and degrees of temper thereto.

Full surface tempered curved glass plates and partially tempered curved glass plates are utilized as window glass plates for cars, airplanes and other vehicles especially for the front, rear, and door windows thereof. The size and shape of particular glass plates are different depending upon the types of windows, and accordingly, it has been necessary to exchange the upper and lower blower head devices so as to correspond to the size and shape of the particularly required curved glass plate. It has therefore been necessary to prepare many types of quenching apparatus for the curved glass plates having various sizes and shapes, and thus, high tooling and maintenance costs are required for the manufacture and maintenance of the various quenching apparatus. Moreover, it is necessary to prepare the cooling apparatus for full surface tempering and partial tempering, and thus, further costs are also required.

SUMMARY OF THE INVENTION

Accordingly, it is an object of the present invention to provide a quenching apparatus for tempering a curved glass plate by ejecting quenching air which can be used for manufacturing various curved glass plates having various sizes and shapes.

The foregoing and other objects of the present invention are attained by the provision of a quenching apparatus for tempering a curved glass plate by air quenching which comprises an upper blower head device and a lower blower head device for air quenching curved glass plates having curvatures at both side portions thereof, and wherein each of the upper and lower blower devices includes a central blower head and side blower heads, the latter of which are adjustable depending upon the curvature of the curved glass plate.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

The curved glass plates for front and rear windows of automobiles usually have different curvatures within the side curved portions thereof, however, the majority of the configurations of the central portions of such curved glass plates are substantially the same as each other, although the types of automobiles with which the windows are associated may differ. Accordingly, a common central blower head, for quenching the central portions of the curved glass plates, is able to be used while side blower heads for quenching the curved portions of both sides of the curved glass plate are selectively adjusted depending upon the curvature of such curved portions, whereby a single quenching apparatus can be utilized for quenching various types of curved glass plates.

The present invention thus provides a quenching apparatus for tempering a curved glass plate by means of a quenching air flow apparatus which comprises separated blower heads having nozzles for quenching both curved side portions and the central portion of the curved glass plate and means for adjusting the side blower heads corresponding to the particular curvatures of the curved sides of the glass plate.

In accordance with the present invention, the full and partial tempering of curved glass plates having different sizes and shapes can thus be attained by means of a simple adjustment or an exchange of nozzles or blower heads without exchanging the main body structure of the quenching apparatus.

Figure 1:
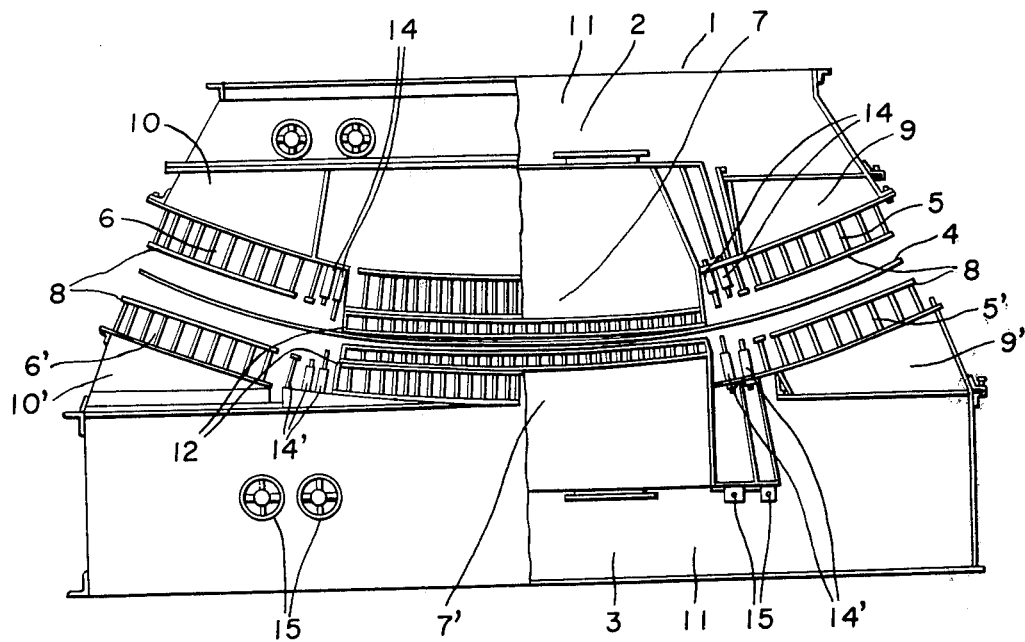
FIG. 1 is a side elevation view, partially in cross-section, of one embodiment of a quenching apparatus, for partially tempering a curved glass plate having curvatures at both sides thereof, constructed in accordance with the present invention and showing its cooperative parts.
Figure 2:
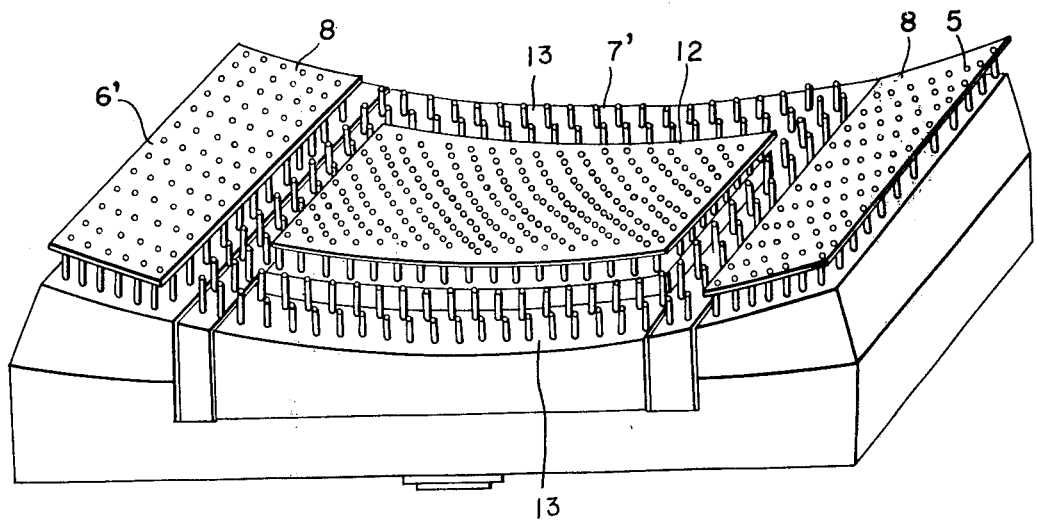
FIG. 2 is a schematic, perspective view of one embodiment of the lower blower head device of the quenching apparatus of the present invention.

Referring now to the drawings, and more particularly to FIGS. 1 and 2 thereof, the quenching apparatus 1 of the present invention is seen to comprise, as best seen within FIG. 1, an upper blower head device 2 and a lower blower head device 3, the head surfaces of which respectively face the corresponding surfaces of the curved glass plate. When the glass plate 4 is interposed between the blower head devices 2 and 3, quenching air is ejected from the upper and lower blower head devices so as to quench the glass plate. It will also be noted that the upper blower head device 2 and the lower blower head device 3 are separated, corresponding to both side portions and the central portion of the curved glass plate 4, so as to form side blower heads 5 and 5', and 6 and 6', and central blower heads 7 and 7'.

The side blower heads 5 and 5', and 6 and 6', have, respectively, a large number of nozzles for ejecting quenching air, and each group of nozzles is fitted with a one-piece blower plate 8. The other ends of the nozzles are connected to blower boxes 9 and 9', and 10 and 10', which are in turn connected to outer blower boxes 11 so as to facilitate the feeding of the quenching air from the blower through means of the outer blower boxes 11 and the blower boxes 9 and 9', and 10 and 10', so as to thereby eject the same from the nozzles.

A blower head 12, for partial tempering, is likewise provided in conjunction with the central blower heads 7 and 7', and the blower head 12, for partial tempering, may have various types of nozzles, having different diameters, which may be arranged in a selectively desirable pattern, so as to impart different degrees of quenching to the central portion of the plate. The central blower heads 7 and 7', except for the blower head 12 for partial tempering, are defined by means of a blower head 13, which is provided for full surface tempering, which has a large number of nozzles having the same size so as to uniformly temper the plate.

Exchangeable auxiliary control blower nozzles 14 and 14' are also arranged at the boundary zone between the central blower heads 7 and 7', for partial tempering, and the blower heads, for full surface, tempering, including the separated side blower heads 5 and 5', and 6 and 6'. The auxiliary control blower nozzles 14 and 14' are utilized when the central zone of the curved glass plate to be tempered is altered, or alternatively, when the partial tempering zone is changed, or still alternatively, when the curved portion is altered, the zone for air quenching by means of the side blower heads 5 and 5', and 6 and 6', and the central blower heads 7 and 7' being suitably controlled. For example, the auxiliary control blower nozzles 14 and 14' can be used as nozzles for the side blower heads in the instance that they are utilized as component parts of the side blower heads, and the auxiliary control blower nozzles 14 and 14' can also be used as nozzles of the central blower heads in the instance that they are utilized as component parts of the central blower heads.

The auxiliary control blower nozzles can be formed so as to be exchangeable by means of special fittings or fastening means whereby exchange of the same, depending upon a particular requirement, is facilitated. The central blower head for partial tempering can be separated into predetermined groups so as to be interchangeable with respect to each other, and in this manner, partial tempering or full surface tempering may be performed, the groups of the central blower head being commonly used for both full surface tempering and partial tempering as desirably selected. In accordance with this feature, a desirable tempered glass plate can be obtained by pre-selecting the nozzles of the blower heads depending upon the size and shape of the glass plate to be tempered.

Figure 5:
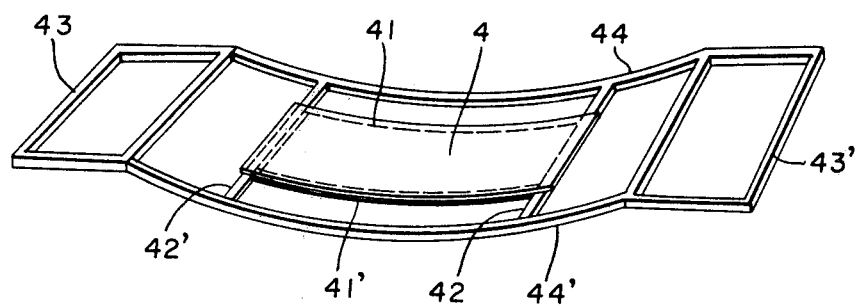
FIG. 5 is a schematic view of a supporter for the glass plate.

With reference now being made to FIG. 5, a supporter for the curved glass plate is disclosed wherein the glass plate 4 is supported upon curved or arcuate transversely extending rods or beams 41 and 41' as well as upon longitudinally extending rods or beams 42 and 42 which are fixed to a frame comprising longitudinally extending members 43 and 43', and transversely extending members 44 and 44'. The longitudinal members 43 and 43' of the frame are supported by means of a conveyor for disposing the glass plate between the upper and lower blower head devices, and it is possible to bend a flat glass plate by disposing the same upon the rods 41, 41', 42 and 42' of the supporter, subsequently heating the glass plate disposed upon the supporter to the softing point temperature thereof, and thereafter bringing the supporter to the blower head devices by means of the conveyor.

The inner blower boxes 9 and 9', and 10 and 10', for feeding quenching air to the nozzles of the central blower heads 7 and 7', the side blower heads 5 and 5', and 6 and 6', and the auxiliary control blower heads 14 and 14', are preferably divided into independent blower boxes correponding to the blower heads so as to be capable of independently controlling the quenching air, and each inner blower box can of course be further divided into a predetermined number of chambers. The outer blower boxes 11 connected to the inner blower boxes are of course disposed so as to distribute air from the blower to the inner blower boxes, one or more outer blower boxes being used, and within the inner or outer blower boxes, it is also possible to provide a damper 15 at a desirable position so as to control the blow rate of air fed from the nozzles of the blower heads.

As noted heretofore, the quenching apparatus of the present invention comprises means for adjusting the side blower heads 5, 5', 6 and 6', provided for quenching the sides of the curved glass plate, so as to correspond to the curved shape of the particular curved part when different curved glass plates, having different curved shapes, are to be tempered, and the means for adjusting the side blower heads will now be described.

It is of course possible to use a mechanism for readily disconnecting and connecting the side blower heads so as to render the same simply exchangeable in correspondence to the curved configuration of the particular curved glass plate, as shown within FIG. 1, and in such an instance, when various side blower heads having different curved configurations are prepared, various types of curved glass plates can be tempered by solely exchanging the side blower heads. The means for controlling the relative disposition of the side blower heads is shown within FIG. 3 as including a bellows component of the side walls of the inner blower boxes 22 and 22' for the side blower heads 21 and 21', whereby, as is readily perceivable, the side walls of the bellows, and the relative angle of the side blower heads with respect to the blower device 3, are axially adjusted depending upon the curved configuration of the curved glass plate, the structure being fixed by means of fixing plates 23 and 23'.

Figure 4:
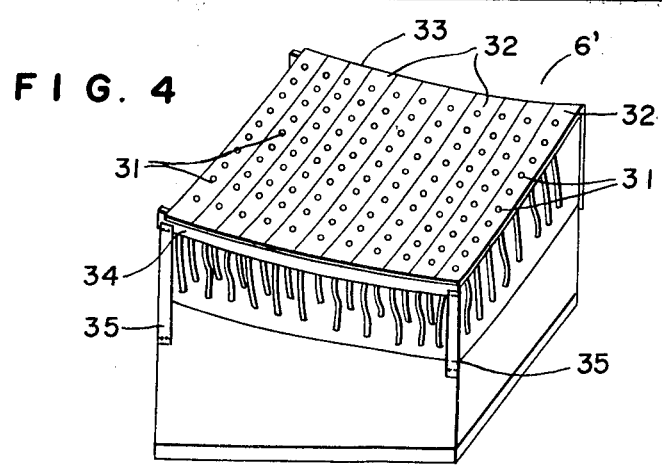
FIG. 4 is a schematic view of another embodiment of a side blower head of the present invention which is adjustable so as to correspond to the curvature of a particular glass plate.

An alternative embodiment is disclosed within FIG. 4, wherein the means for adjusting the blower heads is seen to comprise a plurality of adjustable bars 32 having a row of blower nozzles 31 secured therein which are connected to flexible pipes. Guide rails 34 of the side blower heads 33, being curved so as to correspond to the curved shape of the curved glass plate, are connected to the ends of bars 32 so as to in turn adjust the disposition thereof in correspondence with the curved shape of the plate, and fixing plates 35 are provided for fixing the rails to the blower devices.

Figure 3:
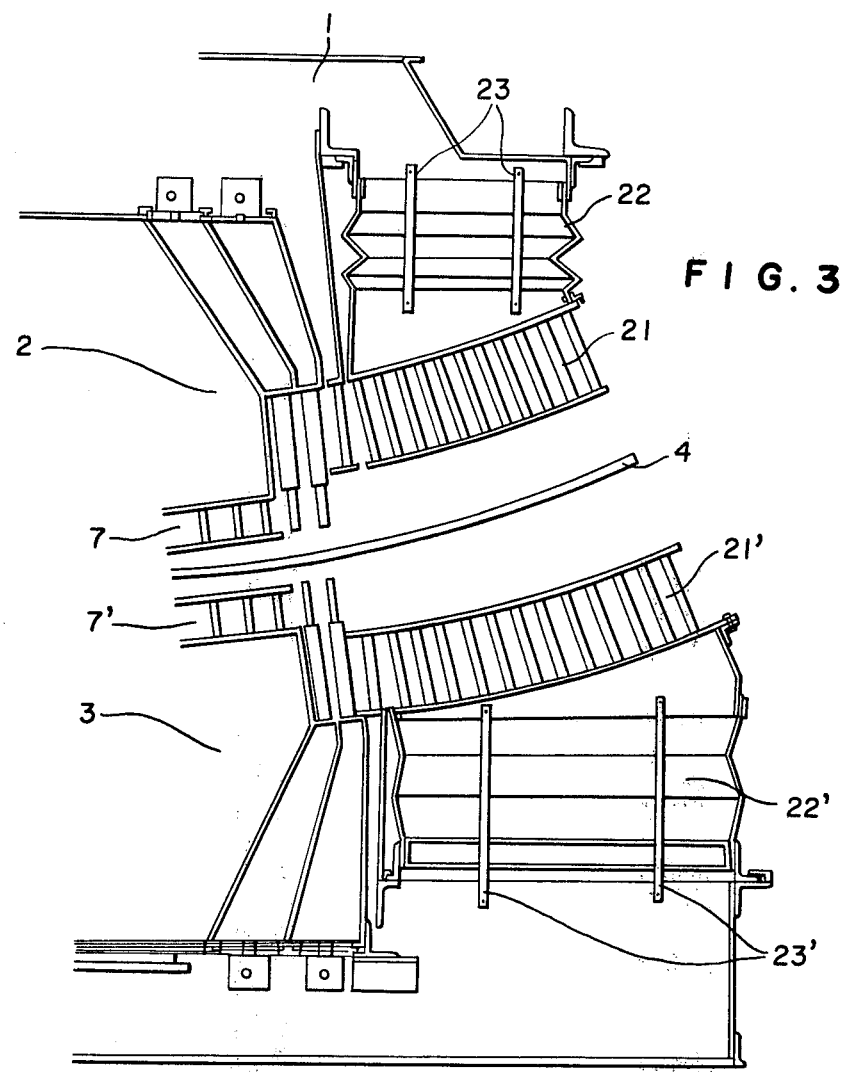
FIG. 3 is an enlarged, partial side view of one embodiment of a side blower head of the quenching apparatus of the present invention.

In accordance then with the means for adjusting the side blower heads, shown within FIGS. 3 and 4, the side blower heads can be easily adjusted in angle and length to correspond to the curved shape of the curved glass plate which is to be tempered by means of the mechanism for adjusting the side blower heads without even exchanging the side blower heads.

Moreover, in accordance with the present invention, when the blower heads 12, for partial tempering, of the central blower heads 7 and 7', are likewise exchangeable, a full surface tempered glass plate can be manufactured solely by exchanging the blower head 12 for a blower head for full surface tempering. The central blower head may have nozzles for full surface tempering disposed within the peripheral part thereof and nozzles for partial tempering disposed within the central part thereof, and the nozzles for partial tempering can be replaced by nozzles for full surface tempering.

The partially tempered glass is prepared by partially tempering different portions of the glass plate, or in other words, to impart different degrees of temper to different portions thereof. When the partially tempered glass is broken, the broken pieces are large or small depending upon the degree of temper. Similarly, the full surface tempered glass is prepared by uniformly tempering the glass plate so as to impart uniform degrees of temper throughout the same. When the full surface tempered glass is broken, the broken pieces are substantially the same size.

The quenching apparatus of the present invention can be used for tempering either a curved glass plate having a particular degree of curvature along both sides thereof or one having a particular degree of curvature along only one side thereof. In the instance of a curved glass plate having a degree of curvature along one side thereof, the central part, referred to hereinabove, is taken to be the relatively flat part except for the curved part thereof.

In accordance with the present invention then, it is seen that various types of curved glass plates having different sizes and configurations can be tempered by exchanging only a portion of the nozzles or by adjusting a portion of the blower heads without exchanging the entire body structure of the quenching apparatus. It is thus unnecessary to prepare various quenching apparatus for various types of curved glass plates.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A quenching apparatus for tempering a curved glass plate, which comprises:
    an upper blower head device and a lower blower head device for quenching said curved glass plate by means of air blown out of said devices and toward opposite surfaces of said plate which is interposed between said devices;
    each of said upper and lower devices including a central blower head having blower nozzles disposed therein, and independent and separated side blower heads, having blower nozzles disposed therein, and disposed upon both sides of said central head wherein said side blower heads include inner blower boxes which are provided with side walls;
    means for axially expandably adjusting said side walls so as to correspondingly adjust said side blower heads to the curvature of the curved portions of said curved glass plate, and means for exchanging said side blower heads so as to alternatively likewise correspond to the curvature of the curved portions of said curved glass plate wherein said side blower heads are operatively connected to blower box means, said side walls of said side blower heads comprise an axially expandably adjustable bellows component so as to in turn adjust the relative angle and length of said blower heads with respect to the apparatus and wherein different type nozzles are disposed upon said central blower heads so as to impart partial tempering to said plates and said partial temper nozzles are exchangeable so as to impart full surface tempering to said plate.

2. A quenching apparatus for tempering a curved glass plate, which comprises:
    an upper blower head device and a lower blower head device for quenching said curved glass plate by means of air blown out of said devices and toward opposite surfaces of said plate which is interposed between said devices;
    each of said upper and lower devices including a central blower head having blower nozzles disposed therein, and independent and separated side blower heads, having blower nozzles disposed therein, and disposed upon both sides of said central head wherein said side blower heads include inner blower boxes which are provided with side walls;
    means for axially expandably adjusting said side walls so as to correspondingly adjust said side blower heads to the curvature of the curved portions of said curved glass plate, and means for exchanging said side blower heads so as to alternatively likewise correspond to the curvature of the curved portions of said curved glass plate wherein said side blower heads are operatively connected to blower box means, said side walls of said side blower heads comprise an axially expandably adjustable bellows component so as to in turn adjust the relative angle and length of said side blower heads with respect to the apparatus; and wherein said central blower heads include nozzles for full surface tempering disposed within the peripheral portion thereof and nozzles for partial tempering disposed within the central portion thereof, said nozzles for partial tempering being replaceable with nozzles for full surface tempering.

3. A quenching apparatus for tempering a curved glass plate, which comprises:
    an upper blower head device and a lower blower head device for quenching said curved glass plate by means of air blown out of said devices and toward opposite surfaces of said plate which is interposed between said devices;
    each of said upper and lower devices including a central blower head having blower nozzles disposed therein, and independent and separated side blower heads, having blower nozzles disposed therein, and disposed upon both sides of said central head wherein said side blower heads include inner blower boxes which are provided with side walls; and means for axially adjusting said side walls so as to correspond to the curvature of the curved portions of said curved glass plate which includes a plurality of adjustable bars, a row of blower nozzles secured to said adjustable bars, guide rails connected to the ends of said adjustable bars which are curved so as to correspond to said curvature of the curved glass plates and fixing plates for fixing said guide rails to said upper and lower devices wherein said side blower heads are operatively connected to blower box means and wherein different type nozzles are disposed upon said central blower head so as to impart partial tempering to said plate, said partial tempering nozzles being exchangeable so as to impart full surface tempering to said plate.

4. A quenching apparatus for tempering a curved glass plate, which comprises:

an upper blower head device and a lower blower head device for quenching said curved glass plate by means of air blown out of said devices and toward opposite surfaces of said plate which is interposed between said devices;

each of said upper and lower devices including a central blower head having blower nozzles disposed therein, and independent and separated side blower heads, having blower nozzles disposed therein, and disposed upon both side of said central head wherein said side blower heads include inner blower boxes which are provided with side walls; and means for axially adjusting said side walls so as to correspond to the curvature of the curved portions of said curved glass plate which includes a plurality of adjustable bars, a row of blower nozzles secured to said adjustable bars, guide rails connected to the ends of said adjustable bars which are curved so as to correspond to said curvature of the curved portion of said curved glass plates for fixing said guide rails to said upper and lower devices wherein said side blower heads are operatively connected to blower box means and said central blower head includes nozzles for full surface tempering disposed within the peripheral portion thereof and nozzles for partial tempering disposed within the central portion thereof, said nozzles for partial tempering being replaceable with nozzles for full surface tempering.

5. The quenching apparatus set forth in claim 2, which further comprises fixing means for fixing said bellows component at a point of adjustment.

6. A quenching apparatus as set forth in claim 5, wherein said means for fixing said bellows component comprises at least one plate.

7. The quenching apparatus as set forth in claim 1, wherein:

auxiliary control blower nozzles are disposed at the boundary zone defined between said central blower heads and said side blower heads.

8. The quenching apparatus as set forth in claim 1, further comprising:

blower box means connected to said central blower heads and said side blower heads for controlling said quenching.

* * * * *